Patented Jan. 12, 1937

2,067,397

UNITED STATES PATENT OFFICE 2,067,397

METHOD FOR THE PREPARATION OF WETTABLE SULPHUR

Arthur H. Henninger, St. Albans, N. Y., assignor to General Chemical Company, New York, N. Y., a corporation of New York No Drawing. Application December 29, 1932, Serial No. 649,322

2 Claims. (Cl. 252—6)

This invention relates to fungicides. The principal object of the invention lies in the provision of fungicides for effectively destroying or preventing fungicidal diseases of fruits and vegetables without injury to produce or foliage. The invention also includes methods for making the improved products.

The fungicides comprising the invention involve compositions containing principally sulphur, and a relatively small amount of residue of the sulphite digestion of wood pulp. The improvements to which the invention relates contemplate fungicides particularly adaptable for use as sprays, but also include fungicides which may be applied in the form of dusts.

Heretofore, sulphur has been employed in fungicides either alone or in various combinations with other substances. Ordinary finely divided sulphur is substantially non-wettable in water, and consequently cannot be satisfactorily suspended in water for spraying on produce and foliage. Neither may ordinary sulphur be properly applied as dust because the sulphur particles have a strong tendency to cling together in balls or lumps. Thus, when ordinary sulphur is applied as a dust, if water is present on foliage or produce, the sulphur will remain on the surface of the water and will not penetrate to the vegetable matter until after the water has evaporated, and then is not uniformly distributed and does not adhere satisfactorily. With such deficiencies of sulphur in view, prior suggestions have been made with respect to provision of sulphur compounds which are readily wetted, and suspended in water and which, when sprayed, will adhere more tenaciously to fruit and foliage. Proposals have hitherto been made with respect to provision of sulphur dusting compositions which do not ball or lump like finely divided ordinary sulphur and which adhere more or less firmly to fruit and foliage. Fungicidal compositions comprising sulphur and a sulphur wetting agent have also been proposed, and it is to compositions of this nature that the present invention is directed.

Prior wetting agents utilized in connection with sulphur fungicides have been effective, but for the most part have been of such nature as to be expensive, and thus unduly increase the cost of the products. Additionally, prior wetting agents have generally been of such character that comparatively large amounts have been employed to make the sulphur fungicide wettable, thus diluting the sulphur product, which dilution is sometimes a disadvantage especially where a product containing a relatively large amount of sulphur is desired.

I have found that the residue of the sulphite digestion of wood pulp is a substance particularly adaptable for use as a sulphur wetting agent in compositions of the character contemplated by the present invention. The use of this residue in conjunction with sulphur has been previously proposed although in not such manner as to produce fungicides having the characteristics of those of the invention. Sulphite liquor residue is not only much cheaper than prior wetting agents, but for reasons not now apparent, this material when incorporated in sulphur compositions enhances the fungicidal properties and the effectiveness of such sulphur compositions in the field.

Sulphite liquor residue, the nature of which is hereinafter noted, as generally obtained on the market is a thick, sticky substance, and for this reason is difficult to incorporate with dry materials, such as sulphur, in operations in which it is desired to mix a relatively small quantity of the liquor residue with large amounts of sulphur. The sulphite liquor residue may be incorporated in the fungicides by diluting the residue in comparatively large quantities of water. However, this procedure is not generally to be desired, as it becomes necessary to dry the resulting mass after introduction of the sulphite liquor residue to evaporate the relatively large excess of water, such operation involving the utilization of substantial quantities of heat, thereby increasing manufacturing costs. Among other features, the invention provides methods by which the sulphite liquor residue may be economically incorporated in the products in such manner that only a comparatively small amount of extraneous heat is required to effect final drying of the products, or in such manner that a final heating and drying operation is unnecessary.

As noted, the products of the invention include sulphur and sulphite liquor residue, the preferred compositions comprising a major portion of sulphur, and a relatively small amount of the sulphite liquor residue. The preferred products comprise about 98% sulphur and about 2% (dry basis) of the sulphite liquor residue. The amount of the latter contained in the final products may vary over a considerable range. Generally, the compositions of the invention should contain not less than about 1% (dry basis) of the residue. The investigations, on which the present improvements are based, indicate that about 1% of residue is desirable to produce a readily wettable sulphur fungicide. However, there may be instances where, on account of the nature of the sulphur, a residue content of less than 1% results in a wettable product. In any event, the amount of residue used should be not less than sufficient to render the product wettable. The amount of sulphur contained in the products varies with the quantity of residue included. Although quantities of residue in excess of about 2% may be employed if desired, no particular advantage is obtained, since larger amounts of residue dilute the products and reduce the sulphur content thereof.

The sulphur contemplated is the ordinary elemental sulphur of commerce (ground brimstone), preferably relatively finely divided, for example say about 300 mesh.

As to the nature of the sulphite liquor residue, in the sulphite process, well known in the paper-making industry, cellulose fibers are separated as pulp from non-cellulose compounds by the sulphite liquor which dissolves the latter compounds. The resulting sulphite liquor containing such compounds comprises what is known as the sulphite waste liquor. The material removed from the cellulose, composed principally of the reaction products of lignin, tannin, sugars, and resins of the wood and other compounds, is contained in the waste liquor from this process either as such or in the form of derivatives. In the digestion process, the formation of a calcium salt of a lignin-sulphonic acid is an important reaction, the waste product thus containing an appreciable quantity of lignin-sulphonate. This liquor, initially containing for example 11 or 12% of the above-noted constituents as solids, is often concentrated by evaporation, and is obtainable as a thick, sticky product containing about 50% solids and about 50% water. The mention herein of evaporated waste residue from the sulphite digestion of wood is intended to designate the substance containing approximately 50% solids and about 50% water. This product contains substantial quantities of tannin, appreciable amounts of organic matter, sulphonates, and smaller quantities of several other substances, such as alumina, magnesia, lime, alkalies, etc. The tannin contained in the substance is believed to be a particularly active ingredient of the final fungicidal products. Sulphite liquor residue, or material of similar characteristics, is preferred since the substance is a very satisfactory agent for rendering sulphur wettable, makes sulphur more readily suspensible in water, causes better adherence to fruit and foliage, and acts as a spreader of the sulphur during evaporation of the water when the products of the invention are applied as sprays.

A specific illustrative example of a preferred procedure involved in making up the product is as follows: About 98 parts of sulphur and about 4 parts of evaporated sulphite liquor residue are placed in a mixing machine provided with paddles or blades or similar elements arranged and constructed so as to rub together the sulphur and the residue. In carrying out the present preferred method of making the products, the incorporation of the residue with the sulphur is best effected by a decided rubbing action as distinguished from a grinding action. The desired rubbing may be obtained by the use of a jacketed mixing machine provided with revolving trowel-type blades the surfaces of which are positioned adjacent the interior wall of the mixer shell. Such blades are spaced away from and are pitched slightly with reference to the wall of the mixer so that the ingredients of the mass are vigorously rubbed together between the blade surfaces and the inner wall of the mixer. The sulphite residue employed in the above is the evaporated substance containing about 50% solids and 50% moisture.

Operating with apparatus of such nature, substantially all of the water initially contained in the sulphite residue is present in the mass after mixing. Accordingly, subsequent to mixing, hot water may be circulated through the jacket of the mixer to evaporate the water remaining in the mass. On drying, a pulverulent product consisting of about 98% sulphur and about 2% residue (dry basis) is obtained.

Because of the particular rubbing action effected, apparatus of this type is preferred, and by proceeding in the above manner, the sulphite liquor residue, a substance which is difficultly incorporated in a large quantity of pulverulent material is efficiently mixed with the sulphur, without the addition of diluting water to the evaporated sulphite residue. Furthermore, a final dry product is obtained without using substantial quantities of extraneous heat to effect final drying.

In some circumstances a mill, for example a mill of the disc type having metal discs or a buhrstone mill having discs of stone-like material, may be employed. When operating with mixing apparatus of this nature, the friction resulting from the rubbing of the particles together generates heat enough to evaporate the water initially contained in the sulphite residue, and to produce a dry, pulverulent material which requires no further drying. When so proceeding, the final product, as before, consists of about 98% sulphur and about 2% residue (dry basis).

It may be desirable, in other instances, to make up the products of the invention in a jacketed mixer, generally similar to those used in the mixing of dough, except for an additional heating water jacket. When using mixers of this type, it is not usually possible to secure the desired intimate mixing and spreading of the sulphite residue over the sulphur without dilution of the sulphite residue. Hence, when employing mixers of this nature, about 3.5 parts of the above residue, containing about 50% solids and 50% moisture, may be diluted with about 12.5 parts of water, and added to about 84 parts of sulphur, and the whole mixed for about 20–30 minutes. The resulting mass is then dried by circulating hot water through the mixer jacket, and ground, if desired, to suitable fineness, the product containing approximately 98% sulphur and 2% residue (dry basis).

The products of the invention may be applied in the field as sprays or dusts, either alone, or in combination with insecticides such as lead arsenate, nicotine, oil sprays, and in general, with stomach poisons, contact insecticides and other fungicides, as for instance Bordeaux mixture or other copper fungicide such as colloidal copper. Further, in carrying out the invention, sulphite residue previously evaporated to dryness may be employed, and in the appended claims, the residue referred to is intended to cover the non-volatile materials present in the sulphite residue.

I claim:

1. The method for making wettable sulphur which comprises vigorously rubbing together a major portion of relatively finely divided inherently non-wettable sulphur and a relatively small amount of evaporated residue from the sulphite digestion of wood in quantity at least sufficient to render the sulphur wettable and readily suspensible in an aqueous solution, said rubbing being carried out under conditions such that friction resulting from the rubbing of the particles together generates heat enough to substantially evaporate liquid contained in the sulphite residue to thereby produce a substantially dry pulverulent wettable sulphur.

2. The method for making wettable sulphur which comprises vigorously rubbing together about 98 parts of relatively finely divided inherently non-wettable sulphur and about 4 parts of evaporated residue from the sulphite digestion of wood, said rubbing being carried out under conditions such that friction resulting from the rubbing of the particles together generates heat enough to substantially evaporate liquid contained in the sulphite residue to thereby produce a substantially dry pulverulent wettable sulphur.

ARTHUR H. HENNINGER.